US012060963B1

(12) United States Patent
Warren (10) Patent No.: US 12,060,963 B1
(45) Date of Patent: Aug. 13, 2024

(54) METHOD AND SYSTEM FOR ENCAPSULATING IN-GROUND ASBESTOS CONCRETE PIPE

(71) Applicant: Danny Warren Consulting, LLC, Carver, MA (US)

(72) Inventor: Danny Warren, Carver, MA (US)

(73) Assignee: Danny Warren Consulting, LLC., Carver, MA (US)

( * ) Notice: Subject to any disclaimer, the term of this patent is extended or adjusted under 35 U.S.C. 154(b) by 0 days.

(21) Appl. No.: 18/640,313

(22) Filed: Apr. 19, 2024

Related U.S. Application Data (63) Continuation-in-part of application No. 18/515,357, filed on Nov. 21, 2023, which is a continuation of application No. 18/209,531, filed on Jun. 14, 2023, now Pat. No. 11,867,338.

(60) Provisional application No. 63/460,326, filed on Apr. 19, 2023.

(51) Int. Cl.
*F16L 55/1645* (2006.01)
*F16L 55/165* (2006.01)

(52) U.S. Cl.
CPC ....... *F16L 55/1645* (2013.01); *F16L 55/1652* (2013.01); *F16L 55/1658* (2013.01)

(58) Field of Classification Search
CPC .............. F16L 55/1645; F16L 55/1652; F16L 55/1658; F16L 55/18; F16L 55/165; F16L 58/1072
See application file for complete search history.

(56) References Cited

U.S. PATENT DOCUMENTS

| | | | | |
|---|---|---|---|---|
| 3,181,302 A | * | 5/1965 | Lindsay | F16L 55/1658 29/241 |
| 4,429,720 A | * | 2/1984 | Beck | E21B 33/1243 138/93 |
| 4,505,302 A | * | 3/1985 | Streatfield | F16L 55/1658 405/184 |
| 4,507,019 A | * | 3/1985 | Thompson | E21B 7/046 405/184 |
| 4,529,008 A | * | 7/1985 | Appleton | H03K 3/356 138/97 |
| 4,903,406 A | * | 2/1990 | Schosek | B23D 21/02 30/103 |

(Continued)

OTHER PUBLICATIONS

Ambler, P.E., Edward Allen, NASTT's Pipe Bursting Good Practices Guidelines, 2019, Third Edition, Benchmark Printing, Inc., New York, US.

(Continued)

*Primary Examiner* — Benjamin F Fiorello (57) ABSTRACT

A process and system is provided to allow rehabilitation of asbestos concrete (AC) pipe to remain in place while rendering the AC pipe harmless, in a manner that protects the ecosystem and saves huge amounts of money lost to bypass, digging, remediation and disposal. The method and system provide for encapsulation of the old AC pipe in place without any digging or disruption to the surrounding area. No dewatering is required, saving the costs required with dewatering. There is minimal disruption to the community's use of the piping system while completing the repair, as such repairs can be done on a manhole-to-manhole basis. Finally, there are no hazardous material disposal requirements, or the costs associated therewith.

16 Claims, 8 Drawing Sheets

(56) References Cited

U.S. PATENT DOCUMENTS

| | | | | |
|---|---|---|---|---|
| 4,955,755 A * | 9/1990 | Frey | ............... | E03F 3/06 405/184.2 |
| 5,171,106 A * | 12/1992 | Rockower | ............... | E21B 29/00 405/184 |
| 5,306,101 A * | 4/1994 | Rockower | ............... | F16L 55/1658 405/184 |
| 5,345,971 A * | 9/1994 | Elgar | ............... | F16L 55/1608 264/269 |
| 5,372,162 A * | 12/1994 | Frey | ............... | F16L 55/1645 264/270 |
| 5,403,122 A | 4/1995 | Granella | | |
| 7,172,370 B2 * | 2/2007 | Schmidt | ............... | F16L 55/1658 405/184.3 |
| 7,434,315 B2 * | 10/2008 | Tjader | ............... | B23D 21/02 30/103 |
| 7,726,028 B2 * | 6/2010 | Koch | ............... | B26D 3/001 30/92.5 |
| 8,109,694 B2 * | 2/2012 | Tjader | ............... | F16L 55/1658 405/184.3 |
| 8,235,075 B2 * | 8/2012 | Saltel | ............... | E21B 29/10 166/212 |
| 8,328,468 B2 * | 12/2012 | Tjader | ............... | B23D 21/14 405/184.3 |
| 9,360,148 B2 * | 6/2016 | Herrick | ............... | F16L 55/165 |
| 2001/0018007 A1 * | 8/2001 | Puttmann | ............... | F16L 55/1658 405/184.3 |
| 2002/0114671 A1 | 6/2002 | Wentworth et al. | | |
| 2003/0084764 A1 * | 5/2003 | Wentworth | ............... | F16L 55/1658 83/13 |
| 2006/0112996 A1 * | 6/2006 | Poole | ............... | F16L 55/1645 138/97 |
| 2006/0157276 A1 * | 7/2006 | Carothers | ............... | E21B 7/30 175/22 |
| 2007/0036613 A1 | 2/2007 | Tjader | | |
| 2007/0048091 A1 * | 3/2007 | Tjader | ............... | F16L 55/1658 405/184.3 |
| 2009/0285635 A1 * | 11/2009 | Tjader | ............... | F16L 55/18 405/184.3 |
| 2010/0178113 A1 * | 7/2010 | Tjader | ............... | E21B 7/205 405/184.3 |
| 2011/0079469 A1 * | 4/2011 | Tjader | ............... | F16L 55/1658 184/14 |
| 2011/0318111 A1 * | 12/2011 | Lee | ............... | F16L 55/164 405/184.1 |
| 2016/0334047 A1 | 11/2016 | Ambler | | |

OTHER PUBLICATIONS

TT Technologies, Grundoburst Static Pipe Bursting System, 2001, website, US.

Massachusetts DEP, Asbestos Cement Pipe Guidance Document, 2019, Mass DEP, Boston, US.

* cited by examiner

METHOD AND SYSTEM FOR ENCAPSULATING IN-GROUND ASBESTOS CONCRETE PIPE

CROSS-REFERENCE TO RELATED APPLICATIONS

This application is a continuation in part of and claims priority from U.S. patent application Ser. No. 18/515,357, filed Nov. 21, 2023 which is a continuation of and claims priority from earlier filed U.S. patent application Ser. No. 18/209,531, filed Jun. 14, 2023; which claims priority from earlier filed U.S. Provisional Patent Application No. 63/460,326, filed Apr. 19, 2023.

BACKGROUND OF THE INVENTION

The present disclosure relates to a method and system for the in-place encapsulation of in-ground asbestos concrete pipe. More specifically, the present disclosure relates to a method and system of splitting, encapsulating and lining an underground asbestos concrete pipe to restore its structural integrity and restore the pipe to its originally designed flow specification.

Asbestos cement (AC) pipes are lightweight, have good workability and are inexpensive. However, they tend to have a lower strength than iron pipes and may suffer from joint slippage and are susceptible to breakage and delamination after many years in service. Further, AC pipe may be eroded by soil, groundwater, or the like, thereby reducing the thickness of the pipe body and significantly reducing the strength. When AC pipe buried in the ground is excavated or as a result of vibration of the road surface or gas or water works, the fragile walls may break, causing leakage or blockage of flow.

As a result, old underground AC pipes sometimes must be removed and replaced with new pipes. In such cases the pipe burial area must be excavated extensively, the old pipe sections removed and the new pipes need to be arranged, resulting in large-scale, construction requiring many man-hours and a high construction cost. Further, since the AC pipes contain asbestos, they require special handling for removal. Removal of pipe, such as asbestos cement, creates health risks, since the asbestos may become airborne, and can flow into the soil and/or water table. The Environmental Protection Agency requires that such asbestos-containing pipes can only be removed by digging a ditch, manually picking up sections or pieces of pipe and placing it in a plastic bag or container, and then taking the bagged material to a hazardous waste disposal site. The alternative to the EPA regulations is to leave the pipe in the ground, which still has potential for soil and water contamination, while depreciating property values for the owners.

It is known that asbestos dust has been found to cause mesothelioma and lung cancer, so there are strict restrictions on its use, but there was no regulation on asbestos in the past, asbestos was frequently used as a pipe reinforcing material. In recent years, when it is necessary to demolish asbestos containing pipe, the asbestos is maintained in a moist state by spraying water etc. sufficiently as the asbestos tube is exposed by crushing the casing with a chipping machine such as a breaker along the pipe while preventing it from scattering. However, the above-mentioned dismantling method has problems, such as the fact that it takes a considerable amount of time and labor for digging and demolition and the dismantling work cannot be performed efficiently. Asbestos scattering in a pipeline environment cannot be completely prevented and there exists a risk that the worker and the surrounding residents could be exposed to the danger of asbestos dust.

The issues related to trenching for pipe removal includes a further difficulty in coastal communities with piping that is 8-10 feet deep, as it is virtually impossible to dig because of high water tables and tidal influences. Below 8-10 feet in depth, the sand and silt become an undiggable soupy and slurry substrate. Many contractors have tried and failed when the earth becomes too wet to dig. Wet conditions also increase the likelihood of more contamination when digging and is a serious danger to workers.

Therefore, a primary objective of the present disclosure is the provision of a method and system for safely and economically reinforcing and encapsulating underground asbestos-containing pipes. A further objective of the present disclosure is the provision of a system having an internal guide head with scribing elements for scribing and separating the walls of the old pipe thereby allowing the halves of the pipe it to be spread apart in order to accommodate the release of a reinforcing material and the installation of a structural liner. These and other objectives will become apparent from the following description of the invention.

SUMMARY OF THE DISCLOSURE

In accordance with the present disclosure, a process and system is provided to allow the AC pipe to remain in place while rendering the AC pipe harmless, in a manner that protects the ecosystem for future generations and saves huge amounts of money lost to bypass, digging, remediation and disposal. The method and system provide for encapsulation of the old AC pipe in place without any digging or disruption to the surrounding area. No dewatering is required, saving the huge costs required with dewatering. There is minimal disruption to the community's use of the piping system while completing the repair, as such repairs can be done on a manhole-to-manhole basis. Finally, there are no hazardous material disposal requirements, or the costs associated therewith.

In a general embodiment, the in-ground encapsulation is accomplished using a device configured and arranged to gently separate the existing AC pipe into two halves along its spring line utilizing 3-4 rolling scribing blades. The scribing blades are arranged on a scribing head, with a plurality of scribing blades arranged in line with one another, having gradually increasing sizes such that the increase in size gradually increases the depth of the scribe in the wall of the pipe as each blade in the line on the scribing head is pulled through the AC pipe, thereby scribing the pipe wall. The scribing head may be formed to include incrementally increasing sizes one behind another, tapered fins extending outwardly from a central core or a series of pins having incrementally increasing length in a row. This creates a very low amount of cut debris which falls into and remains in the bottom half of the pipe. The progressively increasing size of the scribing head causes the existing pipe to separate and spread apart along the scribe lines as the scribing head is drawn through the pipe Immediately following the cutter head is a reinforcement application apparatus. The reinforcement application apparatus may be a spincast type reinforcement application device or a plurality of orthogonally spaced heads. The reinforcement application head deposits a sealing material, such as a moisture activated expanding urethane foam, against the surface of the AC pipe to fill the cracks, seep into the soil surrounding the old AC pipe to provide reinforcement of the pipe and encapsulation of the asbestos material. The reinforcement application apparatus will deliver preferably between 3-5 gallons of the reinforcement material per minute, in liquid form, that will be pressed into the surrounding soil. The reinforcement material immediately expands to encapsulate the entire pipe as well as any scribing debris in the pipe. A new HDPE pipe is pulled directly behind the reinforcement application head into the two separated halves of the old AC pipe. This process is performed at a very slow rate of pull, approximately 2-3 feet per minute. The excess reinforcement material will create a cast around the entire circumference, stopping any migration of asbestos. The reinforcement material will stay in the ground, permanently ending the problem. The old AC pipe and the new HDPE pipe will be permanently glued together.

In one embodiment the method of the present disclosure may be employed to complete the pipe scribing, opening, separating and in-ground encapsulation of asbestos pipe (AC pipe) that is buried down 12-14 feet deep in a site proximate a saltwater beach. The existing AC pipe is suffering a blockage that first must be removed. Removal of blockage in the line is accomplished via a sheet pile work pit. 30-foot long sheet piles will be driven adjacent to the blocked portion of the existing pipe. Once exposed 2 feet of the existing pipe is cut and removed to allow removal of the blockage therein. Then the cut 2-foot section is re-secured in place and backfilled and the sheet piling is removed.

As is known in the art, a launch ramp for new 8" HDPE pipe is established at an existing manhole at one end of the AC pipe to be repaired. At an existing manhole at the other end of the AC pipe to be repaired a winch is set up to pull a scribing head, a reinforcement application assembly and an HDPE lining system into the AC pipe. The hydrophilic reinforcement material head is attached to the bullet head pulling the HDPE pipe in. This will disperse the reinforcement material that will encapsulate the old AC pipe and surrounding soil. The reinforcement material will be applied at 3-6 gal per minute as needed at the required pressure, in a 360-degree circumference to flood the inside of the AC pipe as it is being scribed. The reinforcement material will expand once in the presence of moisture and bind up all the shavings of the AC pipe during the pipe scribing as the head is pulled down the pipeline. The AC pipe will gently be separated into two pieces by the new HDPE pipe being pulled inside of the old AC pipe. The reinforcement material will be forced into the surrounding ground as the new pipe goes into place. The reinforcement material will have a triggered set time prior to expansion. The new HDPE pipe will be bound to the old AC pipe.

It is therefore an object of the present disclosure to provide a method and system for safely and economically reinforcing and encapsulating underground asbestos-containing pipe. It is a further object of the present disclosure to provide a system having an internal guide head with scribing elements for scribing and separating the walls of the old pipe thereby allowing the halves of the pipe it to be spread apart in order to accommodate the release of a reinforcing material and the installation of a structural liner.

These together with other objects of the disclosure, along with various features of novelty which characterize method and system, are pointed out with particularity in the claims annexed hereto and forming a part of this disclosure. For a better understanding of the method and system, its operating advantages and the specific objects attained by its uses, reference should be had to the accompanying drawings and descriptive matter in which there is illustrated a preferred embodiment of the method and system.

BRIEF DESCRIPTION OF THE DRAWINGS

In the drawings which illustrate the best mode presently contemplated for carrying out the present invention.

DETAILED DESCRIPTION OF THE DISCLOSURE

Now referring to the drawings, embodiments of a process and system to allow a deteriorated asbestos concrete (AC) pipe to remain in place while rendering the AC pipe harmless, in a manner that protects the ecosystem and time and money lost to bypass, digging, remediation and disposal is shown and generally illustrated in the figures.

Figure 1:
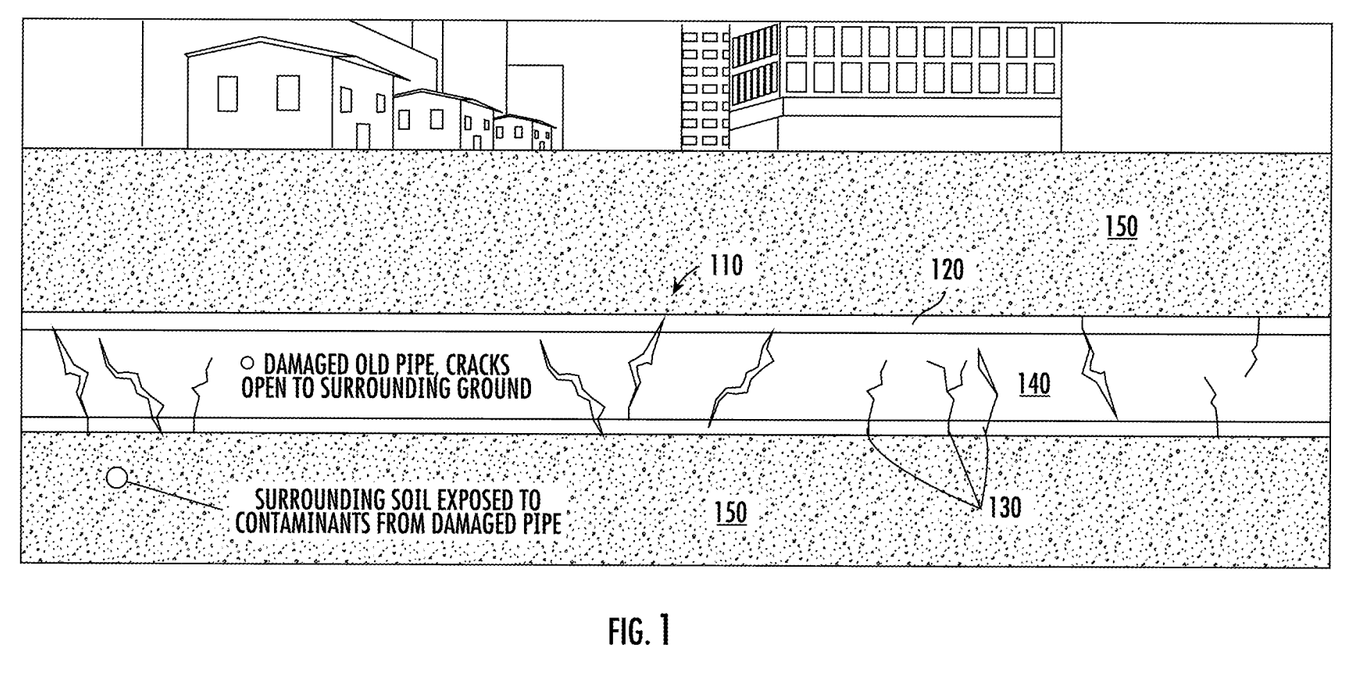
FIG. 1 is a cross sectional view of the existing conditions showing an underground installation of an AC pipe.

Turning now to FIG. 1, AC pipes 110 are lightweight, have good workability and are inexpensive. However, they tend to have a lower strength than iron pipes and may suffer from joint slippage and are susceptible to breakage after many years in service. Further, AC pipe may be eroded by soil, groundwater, or the like, thereby reducing the thickness of the pipe body and significantly reducing the strength. When AC pipe buried in the ground is excavated or as a result of vibration of the road surface or gas or water works, the fragile walls 120 may break, causing cracks 130 that allow leakage of flow from an interior 140 of the AC pipe 110 into the surrounding soil 150 or blockage of flow.

Figure 2A:
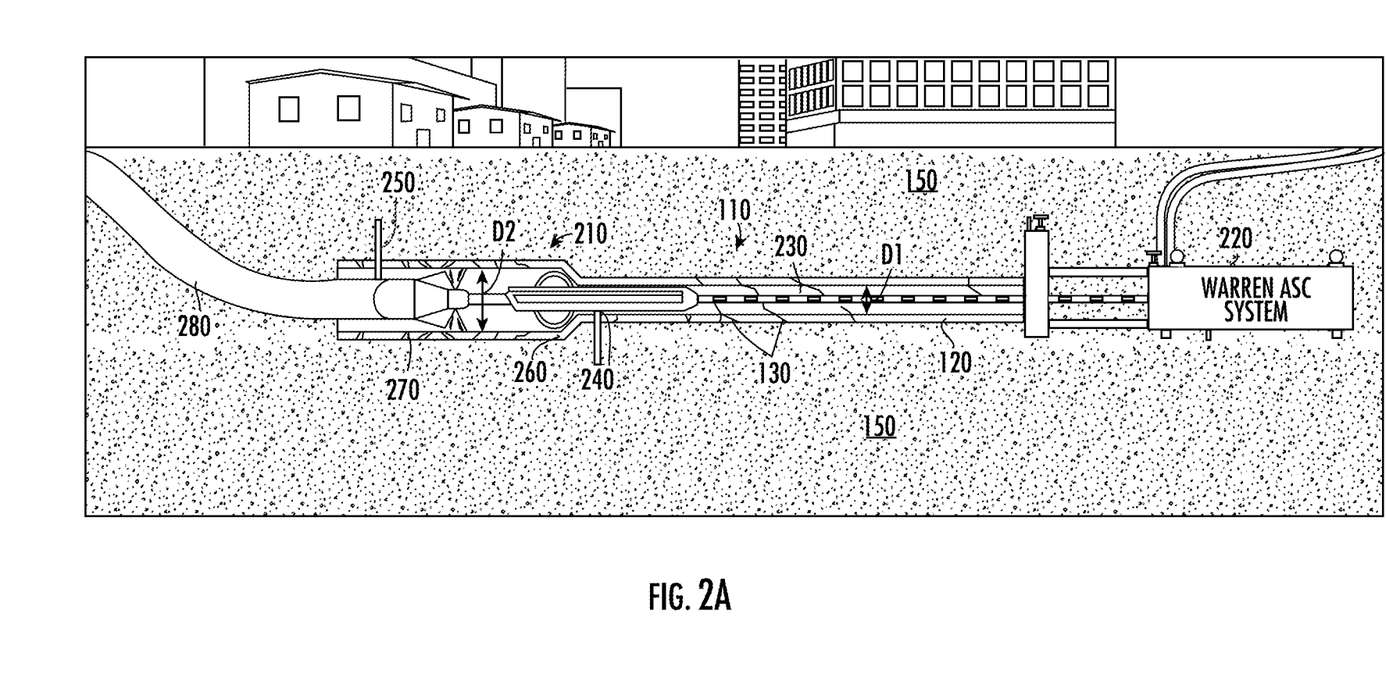
FIG. 2A is a cross sectional view showing an operational system and method of repairing the underground installation of an AC pipe of FIG. 1.

In accordance with the present disclosure, as shown generally at FIG. 2A, the method and system 210 provides for encapsulation of the old AC pipe in place without any digging or disruption to the surrounding area. No dewatering is required, saving the huge costs required with dewatering. There is minimal disruption to the community's use of the piping system while completing the repair, as such repairs can be done on a manhole-to-manhole basis. Finally, there are no hazardous material disposal requirements, or the costs associated therewith.

In a general embodiment, the in-ground encapsulation is accomplished using a method and system 201 generally including a tow control and grout supply system 220, a tow cable and grout supply tether 230, a scribing head 240, and a reinforcement liquid dispensing apparatus 250. The tow controller 220 drags the tow cable 230 that has the scribing head 240 attached at an opposing terminal end. The scribing head 240, as will be described in more detail below, is configured and arranged to gently separate the existing AC pipe into two halves along its spring line utilizing 3-4 rolling scribing blades. The scribing blades are arranged on the scribing head 240, with a plurality of scribing blades arranged in line with one another, having gradually increasing sizes such that the increase in size gradually increases the depth of the score in the wall of the pipe as each blade in the line on the scribing head is pulled through the AC pipe, thereby scribing the pipe wall. This creates a very low amount of cut debris which falls into and remains in the bottom half of the pipe. The progressively increasing size of the scribing head causes the existing pipe to burst as seen at location 260, along the scribe lines as the scribing head is drawn through the pipe. As a result, the space on the interior of the pipe walls 120 is increased from a first installed diameter D1 to a second larger diameter D2 to allow space for expanding grout 270 and a new liner 280.

Immediately following the scribing head 240 is a reinforcement material dispensing apparatus 270. The reinforcement material dispensing apparatus may be a spincast type dispenser or a plurality of orthogonally spaced heads. A supply of sealing material, such as a moisture activated expanding urethane foam, is supplied to the reinforcement material dispensing apparatus 270 via a pump in the tow control and liquid supply system 220, through hoses that are in the tow cable and liquid supply tether 230. The dispensing apparatus 270 deposits a sealing material, such as a moisture activated expanding urethane foam, against the interior surface of the AC pipe, in liquid form, to fill the cracks, seep into the soil surrounding the old AC pipe to provide reinforcement of the pipe and encapsulation of the asbestos material. The dispensing apparatus 270 will deliver preferably between 3-5 gallons of reinforcement material per minute that will be pressed into the surrounding soil. The reinforcement material immediately expands to encapsulate the entire pipe as well as any scribing debris in the pipe. A new HDPE pipe liner 280 is pulled directly behind the dispensing apparatus 270 into the scribed and separated portions of the old AC pipe. This process is performed at a very slow rate of pull, approximately 2-3 feet per minute.

Figure 2B:
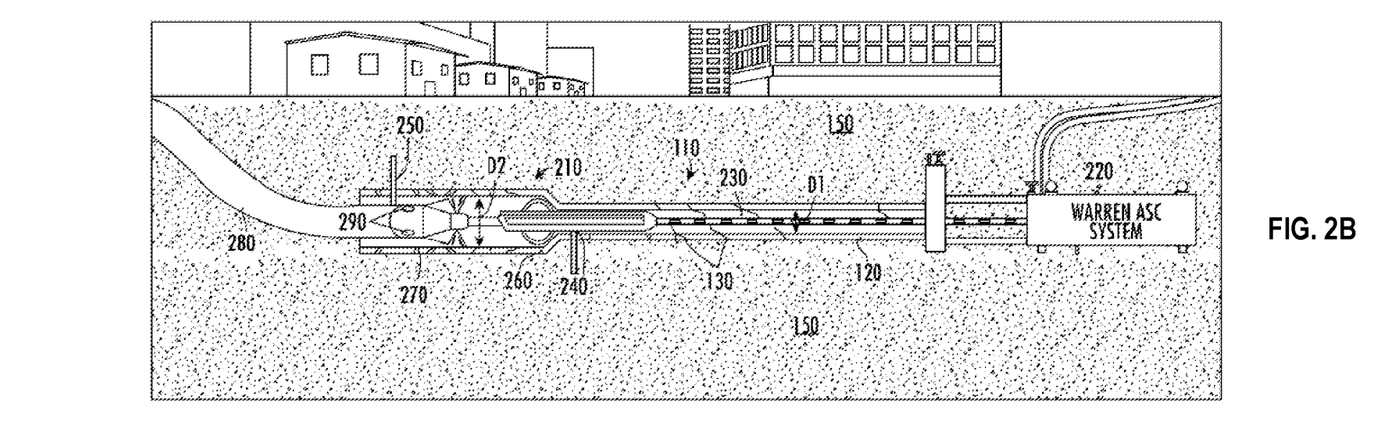
FIG. 2B is a cross sectional view showing an alternative operational system and method of repairing the underground installation of an AC pipe of FIG. 1.

In an alternate arrangement as depicted at FIG. 2B, following the reinforcement material dispensing apparatus 270 is an arrangement of water jets 290. The dispensing apparatus may be a spincast type sprayer or a plurality of orthogonally spaced heads. A supply of reinforcement material supplied to the dispensing apparatus 270 via a pump in the tow control and liquid supply system 220, through hoses that are in the tow cable and liquid supply tether 230. The dispensing apparatus 270 deposits the reinforcement material against the interior surface of the AC pipe to fill the cracks, seep into the soil surrounding the old AC pipe to provide reinforcement of the pipe and encapsulation of the asbestos material. The dispensing apparatus 270 will deliver preferably between 3-5 gallons of flexible reinforcement material per minute that will be pressed into the surrounding soil. The water jets 290 deliver a flow of water to the reinforcement material to facilitate activation of the reinforcement material wherein the reinforcement material, in liquid form, immediately expands to encapsulate the entire pipe as well as any scribing debris in the pipe. A new HDPE pipe liner 280 is pulled directly behind the dispensing apparatus 270 into the separated portions of the old AC pipe. This process is performed at a very slow rate of pull, approximately 2-3 feet per minute.

Figure 2C:
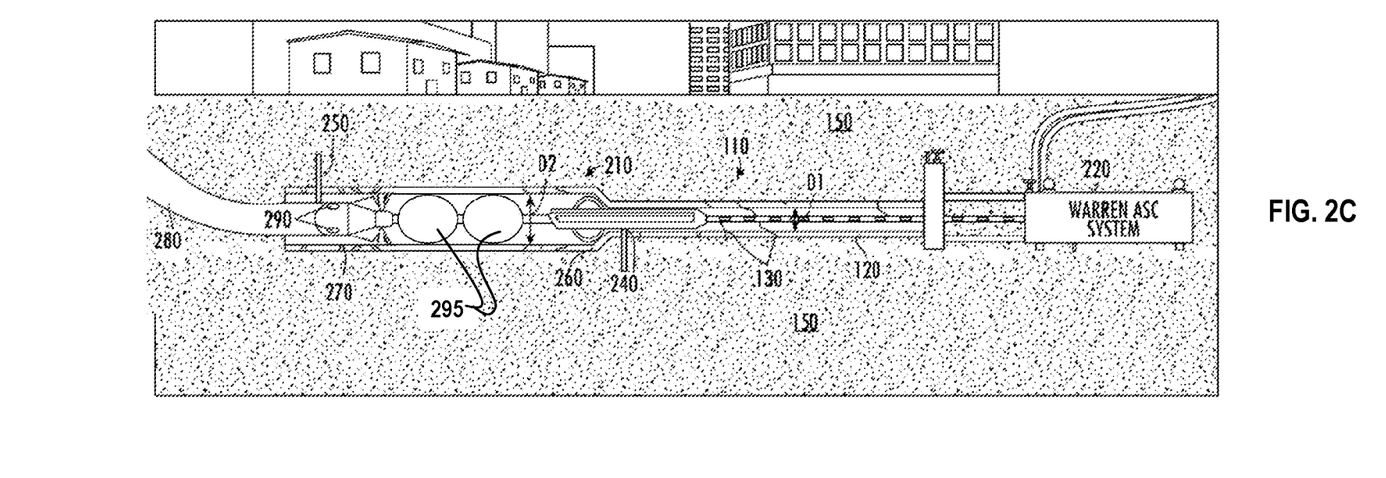
FIG. 2C is a cross sectional view showing a second alternative operational system and method of repairing the underground installation of an AC pipe of FIG. 1.

In another alternate arrangement as depicted at FIG. 2C, following the scribing head 240 and positioned before the reinforcement material dispensing apparatus 270 is an arrangement of sealing elements 295. The dispensing apparatus may be a spincast type sprayer or a plurality of orthogonally spaced heads. A supply of reinforcement material supplied to the dispensing apparatus 270 via a pump in the tow control and liquid supply system 220, through hoses that are in the tow cable and liquid supply tether 230. The dispensing apparatus 270 deposits the reinforcement material against the interior surface of the AC pipe to fill the cracks, seep into the soil surrounding the old AC pipe to provide reinforcement of the pipe and encapsulation of the asbestos material. The dispensing apparatus 270 will deliver preferably between 3-5 gallons of flexible reinforcement material per minute that will be pressed into the surrounding soil. The sealing elements 295 are positioned between the scribing head 240 and the dispensing apparatus in a manner such that upon activation of the reinforcement material as it expands to encapsulate the entire pipe as well as any scribing debris in the pipe the expansion of the reinforcement material is prevent from expanding in a forward direction on the interior of the pipe and prevented from reaching the scribing head 240. The sealing elements 295 are preferably have an ellipsoid shape but may also be spherical or cylindrical. While two sealing elements are shown a singular element may be employed of an array of multiple sealing elements may be provided in a linear array. Preferably, the sealing elements 295 are of a rigid construction having an approximate or slightly smaller diameter than that of the new HDPE pipe liner 280. Sealing elements may be rigid or be slightly compressible so as to form a reliable seal against forward progression of the expanding sealant. A new HDPE pipe liner 280 is pulled directly behind the dispensing apparatus 270 into the separated portions of the old AC pipe. This process is performed at a very slow rate of pull, approximately 2-3 feet per minute.

Figure 3:
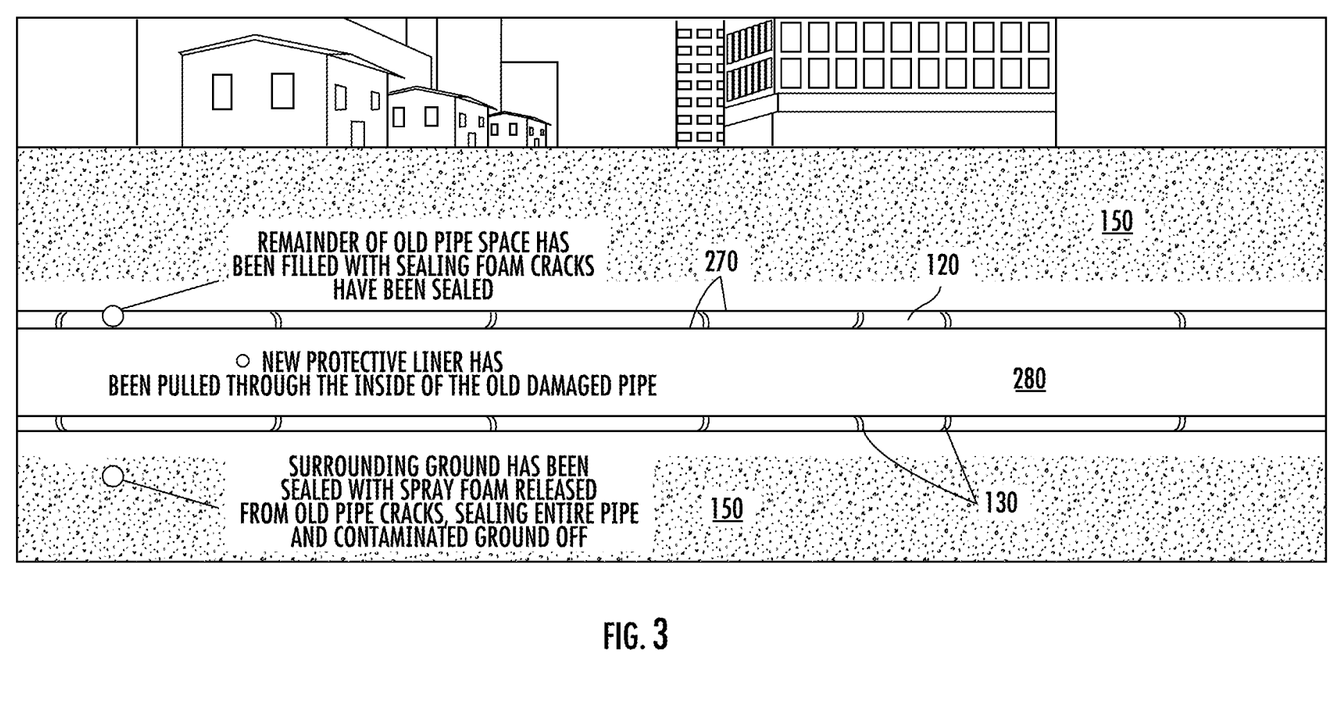
FIG. 3. is a cross sectional view showing an underground installation of an AC pipe repaired in accordance with the method and system of FIG. 2.

As can be seen at FIG. 3, the reinforcement material 270 will fill a layer on the interior of the pipe wall 120, between the pipe wall 120 and the liner 208 as well as seeping through the cracks 130 and into the surrounding soil 150 creating a cast around the entire circumference at the interior and exterior of the pipe wall 120, stopping any migration of asbestos. The reinforcement material 270 will stay in the ground, permanently ending the problem. The old AC pipe and the new HDPE pipe will be permanently glued together.

Figure 4A:
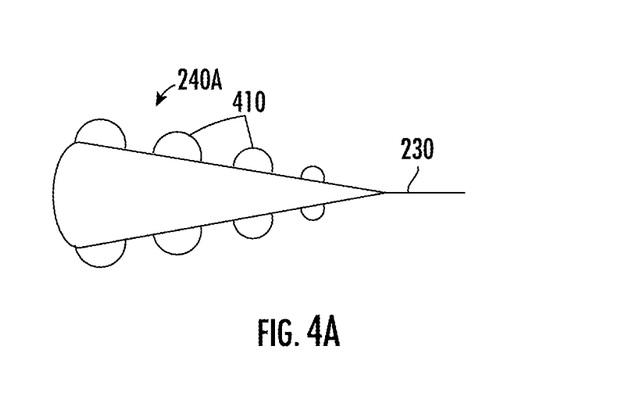
FIGS. 4A, 4B and 4C are schematic views of alternate embodiments of scribing heads for use with the present method and system.
Figure 4B:
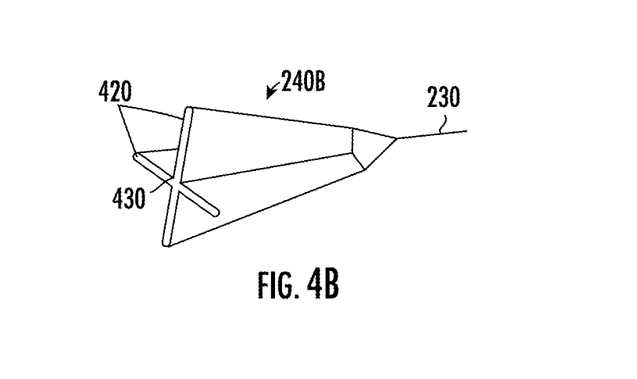
Figure 4C:
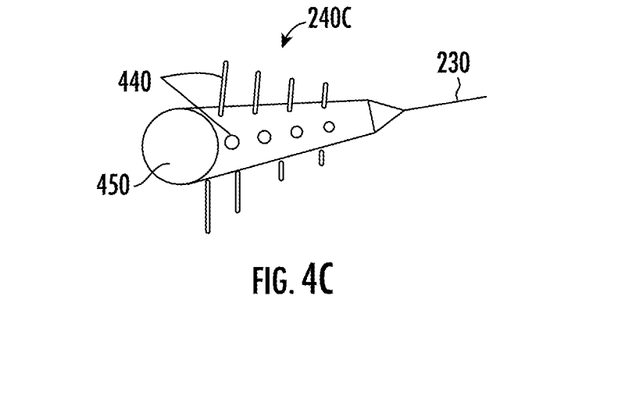

Turning now to FIGS. 4A, 4B and 4C illustrative embodiments of a scribing head 240A, 240B and 240C are shown respectively. In all embodiments, the scribing head 240A, 240B and 240C may be formed to include incrementally increasing sizes one behind another. Scribing head 240A employs a plurality of scribing wheels 410 disposed orthogonally to one another around the scribing head 240A. Scribing head 240B employs orthogonally arranged tapered fins 420 extending outwardly from a central core 430. Similarly, scribing head 240C employs a series of pins 240 having incrementally increasing length in a row disposed about a central core 450 where pins may be tapered rearwardly relative to the direction in which the scribing head is pulled. The scribing surfaces of the scribing wheels, fins and/or pins may be sharpened, further they may include embedded diamond or other abrasive material, still further they may be carbide tipped.

Figure 5:
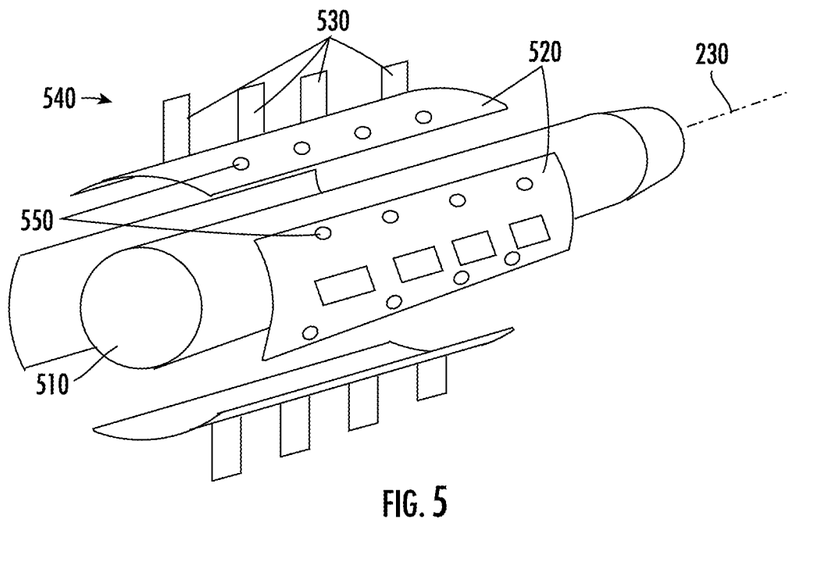
FIG. 5 illustrates a modular replacement system for the scribing heads of the present disclosure.

As shown in FIG. 5, a modular scribing head 540 may be employed. The scribing head includes a central body 510 with one or more modular scribing arrays 520 disposed about the central body 510. Each of the modular scribing arrays 520 include one or more scribing elements 530 disposed and arranged thereon. Scribing elements 530 may be of any type or style as discussed above with respect to FIGS. 4A, 4B and 4C. The scribing arrays 520 are modular and affixed to the central body 510 with removable fasteners such as bolts 550 such that as the scribing elements 530 on the scribing array 520 become worn, the worn scribing array 520 can be removed and replaced.

Figure 6:
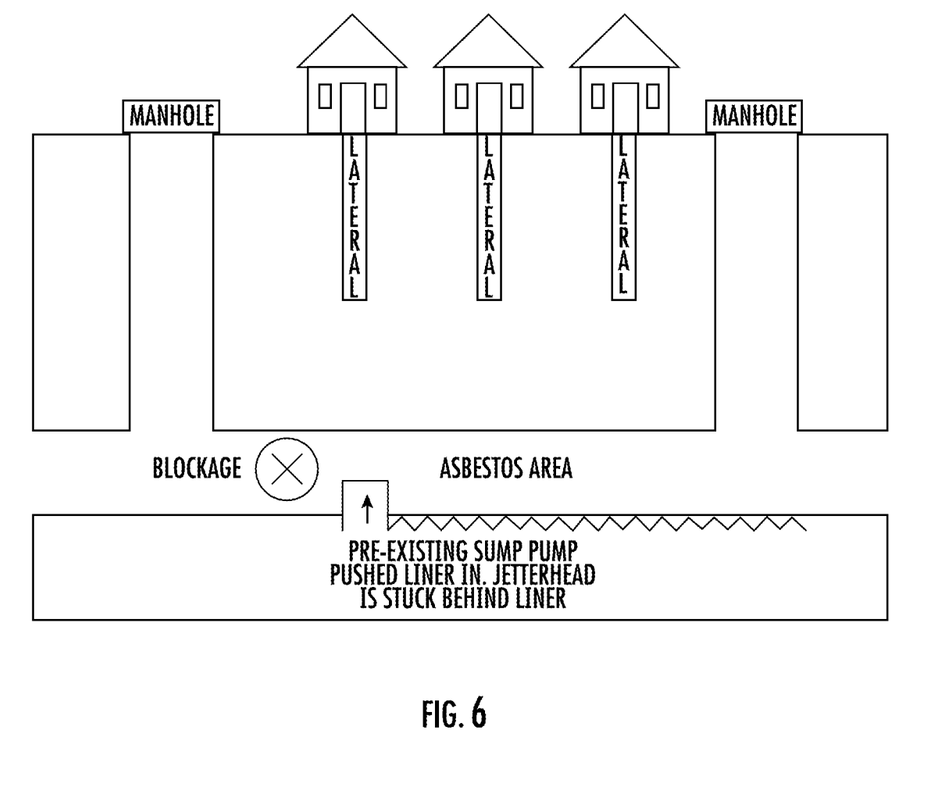
FIG. 6 is a schematic cross-sectional view of existing conditions in an illustrative embodiment.
Figure 7:
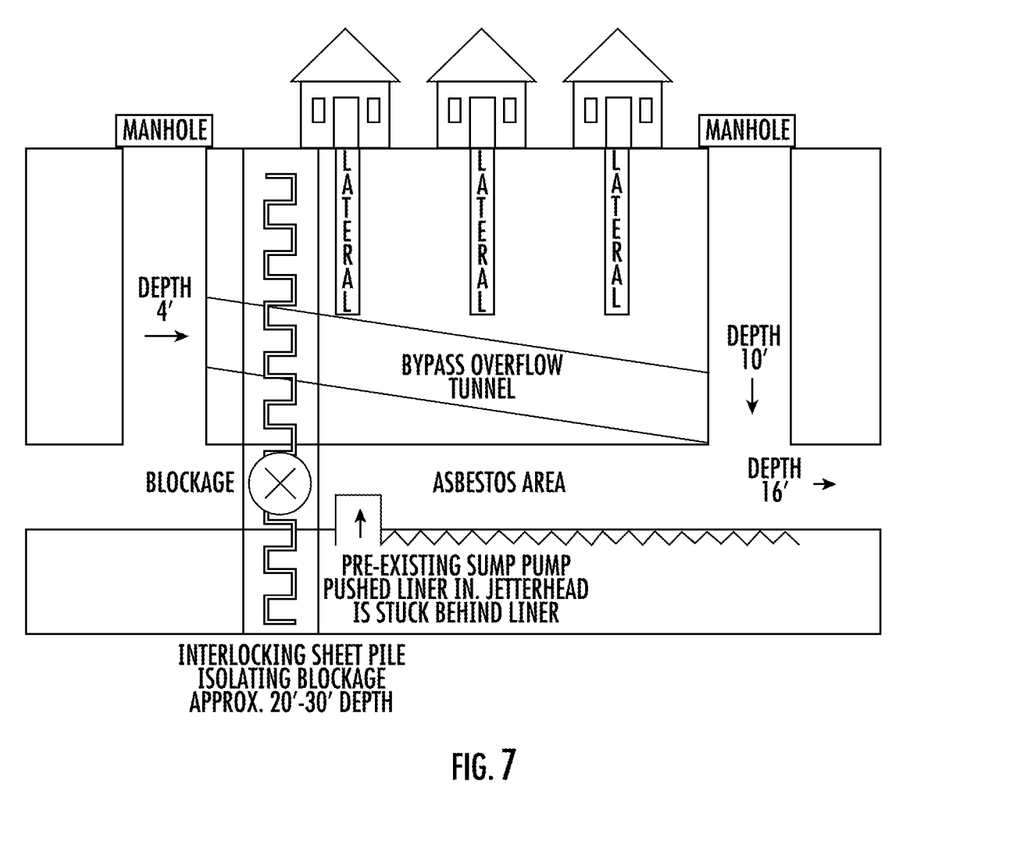
FIG. 7 is a schematic cross-sectional view of an illustrative embodiment of a repair solution for the existing conditions in FIG. 6.

In one embodiment, illustrated at FIGS. 6 and 7, the method of the present disclosure may be employed to complete the pipe scribing, separating and in-ground encapsulation of asbestos pipe (AC pipe) that is buried down 12-14 feet deep in a site proximate a saltwater beach. The existing AC pipe is suffering a blockage that first must be removed. Removal of blockage in the line is accomplished via a sheet pile work pit. 30-foot long sheet piles will be driven adjacent to the blocked portion of the existing pipe. Once exposed 2 feet of the existing pipe is cut and removed to allow removal of the blockage therein. Then the cut 2-foot section is re-secured in place and backfilled and the sheet piling is removed.

As is known in the art, a launch ramp for new 8" HDPE pipe is established at an existing manhole at one end of the AC pipe to be repaired. At an existing manhole at the other end of the AC pipe to be repaired a winch is set up to pull a scribing head, a dispensing assembly and an HDPE lining system into the AC pipe. The dispensing head is attached to the bullet head pulling the HDPE pipe in. This will disperse the reinforcing material that will encapsulate the old AC pipe and surrounding soil. The reinforcing material will be applied at 3-6 gal per minute as needed at the required pressure, in a 360-degree circumference to flood the inside of the AC pipe as it is being scribed. The reinforcing material, in liquid form, will expand once in the presence of moisture and bind up all the shavings of the AC pipe during the pipe scribing as the head is pulled down the pipeline. The AC pipe will gently be separated into two pieces by the new HDPE pipe being pulled inside of the old AC pipe. The reinforcing material will be forced into the surrounding ground as the new pipe goes into place. The reinforcing material will have a triggered set time prior to expansion. The new HDPE pipe will be bound to the old AC pipe.

It can therefore be seen that the present disclosure provides a method and system for safely and economically reinforcing and encapsulating underground asbestos-containing pipe. It can be further seen that the present disclosure provides a system having an internal guide head with scribing elements for scribing and separating the walls of the old pipe thereby allowing the halves of the pipe it to be spread apart in order to accommodate the application of a reinforcing material and the installation of a structural liner. For these reasons, the present disclosure is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A system for insitu repair and encapsulation of an inground pipeline, comprising:
    a tow control and reinforcement material supply system;
    a scribing head;
    a plurality of scribing elements arranged about said scribing head, each of said plurality of scribing elements including a plurality of individual scribing blades arranged in a linear fashion thereon;
    a sealing element;
    an application apparatus; and
    a tow cable and reinforcement material supply tether connecting said tow control and reinforcement material supply system to said scribing head and said application apparatus,
    wherein each of said plurality of scribing blades increase in size along their respective scribing element to progressively create deeper scores in a wall of said inground pipeline until said wall separates, said application apparatus applying an expanding reinforcement material, in liquid form, to the separated wall of said inground pipeline, said sealing element preventing said expanding reinforcement material from reaching said scribing head.

2. The system of claim 1, wherein said scribing elements are affixed to a body of the scribing head using removable fasteners.

3. The system of claim 1, said sealing element further comprising:
    one or more rigid sealing elements having a shape selected from the group consisting of: spherical, cylindrical and ellipsoidal.

4. The system of claim 1, wherein said application apparatus further tows a pipe lining into said inground pipeline.

5. The system of claim 4, wherein said expanding reinforcement material encapsulates said opened and separated wall and fills a void between said opened wall and said pipe lining.

6. The system of claim 1, wherein said scribing blades are selected from a group consisting of: cutter wheels, fins, pins, and combinations thereof.

7. The system of claim 1, wherein said scribing blades include an abrasive material embedded there.

8. The system of claim 1, wherein the scribing blades are at least partially a carbide material.

9. A method for insitu repair and encapsulation of an inground pipeline, comprising:
    providing a tow control and reinforcement material supply system that draws, via a tow cable, a reinforcement material supply tether, a sealing array, and a scribing head through an interior of said inground pipeline to be repaired, wherein said scribing head includes scribing elements including a plurality of individual scribing blades arranged in a linear fashion thereon, the scribing blades increasing in size along their respective scribing element to progressively create deeper scores in a wall of said inground pipeline until said wall opens and separates;
    applying an expanding reinforcement material, in liquid form, via an application apparatus, also connected to said tow cable and reinforcement material supply tether, to the opened and separated wall of said inground pipeline, wherein said expanding reinforcement material encapsulates the opened and separated wall of said inground pipeline, said sealing element preventing said expanding reinforcement material from reaching said scribing head.

10. The method of claim 9, wherein said scribing elements are affixed to a body of the scribing head using removable fasteners.

11. The method of claim 9, said sealing element further comprising:

one or more rigid sealing elements having a shape selected from the group consisting of: spherical, cylindrical and ellipsoidal.

12. The method of claim 9, further comprising:
installing a pipe lining into said inground pipeline.

13. The method of claim 12, wherein said expanding reinforcement material encapsulates said burst wall and fills a void between said burst wall and said pipe lining.

14. The method of claim 9, wherein said scribing blades are selected from a group consisting of: cutter wheels, fins, pins, and combinations thereof.

15. The method of claim 9, wherein said scribing blades include an abrasive material embedded there.

16. The method of claim 9, wherein the scribing blades are at least partially a carbide material.

\* \* \* \* \*